US009635003B1

(12) United States Patent
Lackey et al.

(10) Patent No.: US 9,635,003 B1
(45) Date of Patent: Apr. 25, 2017

(54) METHOD OF VALIDATING A PRIVATE-PUBLIC KEY PAIR

(71) Applicant: The United States of America as represented by the Director, National Security Agency, Washington, DC (US)

(72) Inventors: Bradley C. Lackey, Odenton, MD (US); Mark J. Motley, Odenton, MD (US); Jerome A. Solinas, Hanover, MD (US)

(*) Notice: Subject to any disclaimer, the term of this patent is extended or adjusted under 35 U.S.C. 154(b) by 0 days.

(21) Appl. No.: 14/545,513

(22) Filed: Apr. 21, 2015

(51) Int. Cl.
*H04L 29/06* (2006.01)
*H04L 9/30* (2006.01)
*H04L 9/06* (2006.01)

(52) U.S. Cl.
CPC .......... *H04L 63/061* (2013.01); *H04L 9/0631* (2013.01); *H04L 9/3073* (2013.01); *H04L 63/0428* (2013.01); *H04L 2209/24* (2013.01)

(58) Field of Classification Search
CPC . H04L 63/061; H04L 63/0442; H04L 9/0841; H04L 9/3066; H04L 9/0819; H04L 9/0816; H04L 9/086
See application file for complete search history.

(56) References Cited

U.S. PATENT DOCUMENTS

| 6,141,420 | A * | 10/2000 | Vanstone | G06F 7/725 380/28 |
| 9,258,303 | B1 * | 2/2016 | Galwas | H04L 63/0869 |
| 2002/0025034 | A1 * | 2/2002 | Solinas | H04L 9/3066 380/30 |
| 2005/0097332 | A1 * | 5/2005 | Imai | G06F 21/33 713/176 |
| 2008/0123842 | A1 * | 5/2008 | Pohja | H04L 9/302 380/44 |
| 2011/0208970 | A1 * | 8/2011 | Brown | H04L 9/0844 713/176 |

(Continued)

OTHER PUBLICATIONS

Barker et al., NIST Special Publication 800-56A—Recommendation for Pair-Wise Key Establishment Schemes Using Discrete Logarithm Cryptography, Mar. 2007, NIST, 115 Total Pages.*

(Continued)

*Primary Examiner* — Farid Homayounmehr
*Assistant Examiner* — Christopher C Harris

(57) ABSTRACT

A key pair validation method provides for a first party to generate a seed to define a private key, a public key, a session key and a validation field for the purpose of performing a cryptographic activity with a second party. The validation field is determined by encrypting the first party seed. The second party receives the first party public key and the validation field from the first party. The second party calculates a session key and utilizing the calculated session key, decrypts a cipher text to recover the first party's seed and the first party's private and public key. The recovered first party public key is compared to the received first party public key. If the received and recovered public keys match, the private-public key pair received from the first party is validated and the second party proceeds with the cryptographic task. If the received and recovered public keys do not match, the second party simply reports to the first party that the cryptographic task failed.

10 Claims, 2 Drawing Sheets

(56) References Cited

U.S. PATENT DOCUMENTS

| | | | | |
|---|---|---|---|---|
| 2012/0023336 | A1* | 1/2012 | Natarajan | H04L 9/0841 713/179 |
| 2014/0064491 | A1* | 3/2014 | Ghouti | H04L 9/3013 380/282 |
| 2014/0082358 | A1* | 3/2014 | Nakhjiri | H04L 9/0822 713/168 |
| 2015/0310427 | A1* | 10/2015 | Yi | G06Q 20/385 705/64 |
| 2015/0333906 | A1* | 11/2015 | Rahman | G06F 7/58 380/44 |
| 2015/0339102 | A1* | 11/2015 | Feix | G06F 7/725 380/30 |
| 2015/0372811 | A1* | 12/2015 | Le Saint | H04L 9/0841 705/76 |
| 2016/0065370 | A1* | 3/2016 | Le Saint | H04L 9/0841 713/155 |

OTHER PUBLICATIONS

ANSI X9.63 Public Key Cryptography for the Financial Services Industry: Elliptic Curve Key Agreement and Key Transport Schemes, Jul. 5, 1998, 125 Total Pages.*
Antipa et al, Validation of Elliptic Curve Public Keys, Dec. 2003, Springer-Verlag Berlin Heidelberg, 13 pages total.*
Antipa, A. et al., Validation of Elliptic Curve Public Keys, Y. G. Desmedt (Ed.): PKC 2003, LNCS 2567, pp. 211-223, 2003, Springer-Verlag Berlin Heidelberg 2003.
Fujisaki, E. et al., Secure Integration of Asymmetric and Symmetric Encryption Schemes, Michael Wiener (Ed.): CRYPTO '99, LNCS 1666; pp. 537-554, 1999, Springer-Verlag Berlin Heidelberg 1999.
Menezes, A. et al., On the Importance of Public-Key Validation in the MQV and HMQV Key Agreement Protocols, R. Barua and T. Lange (Eds.): INDOCRYPT 2006, LNCS 4329, pp. 133-147, 2006, Springer-Verlag Berlin Heidelberg 2006.

* cited by examiner

METHOD OF VALIDATING A PRIVATE-PUBLIC KEY PAIR

FIELD OF THE INVENTION

This invention is generally directed to a method of validating a private-public key pair in a cryptographic key agreement protocol.

BACKGROUND OF THE INVENTION

A key-agreement protocol is a means by which two parties initiate cryptographic tasks, such as, for example sending and receiving encrypted messages or authenticating a message which is received. The key-agreement protocol provides for an exchange of public keys, the result of this exchange is a common shared secret or session key. This shared secret or session key is used for the cryptographic tasks to be performed, for example to encrypt and decrypt further communications between the parties, in order to ensure that if messages are intercepted, the interceptor cannot decrypt these messages and gain access to the information they contain. The public key of the private-public key pair is widely distributed, but the private key is known only to its owner. Although the private and public keys are mathematically related, the parameters of the keys are chosen so that calculating the private key from the public key is either impossible or prohibitively expensive. For example, in elliptic curve cryptography, the private key is a number and the associated public key is a point on an elliptic curve obtained by scalar multiplication of a fixed basepoint on the elliptic curve by the private key. Calculating the private key from the associated public key requires the computation of an elliptic curve discrete logarithm, which is widely believed difficult for traditional computing platforms but is known to be simple for quantum computers. For another example, in lattice-based cryptography the private key is a vector in a high dimensional lattice and the associated public key is obtained by adding a small random perturbation to the private key. Calculating the private key from the associated public key requires solving the closest lattice vector problem, which is known to be difficult for traditional computing platforms and is widely believed to be difficult for quantum computers as well.

For ease of discussion and as is customary when describing electronic messaging between parties, we will identify the parties desiring to communicate as Alice and Bob. Alice and Bob each hold a private-public key pair. Alice's private key is designated as "a" and Alice's public key is designated as "A", forming the private-public key pair (a, A). Likewise, Bob's private key is designated as "b" and Bob's public key is designated as "B", forming the private-public key pair (b, B). In our discussions, Bob will be the sender of a communication and therefore will be referred to as the first party and Alice will be the intended recipient of the communication and will be referred to as the second party.

Pursuant to the key agreement protocol Alice, the second party, has made her public key A widely available by publishing it or otherwise transmitting it publicly to Bob, the first party. Bob computes the session key k using his private key b and Alice's public key A, and sends his public key, B, along with the message which was encrypted utilizing the session key k. When Alice receives Bob's public key, she utilizes Bob's public key (B) along with her private key (a) to calculate the session key. For example, the key agreement protocol may provide a session key protocol which defines the relationship between the first party's public key and the second party's private key and the session key, e.g. k=aB. Upon calculating the session key, Alice is able to decrypt the message. If on the other hand, the pubic key, B, received from Bob is incorrect, the session key calculated by Alice will not be correct and Alice will not be able to decrypt the message she received from Bob. Alice will likely report to Bob that she was unable to decrypt the message.

A valid key pair is one which is generated using the key agreement protocol. We will use the notation (b, B) to denote a valid key pair. In some instances, despite the fact that the key pair is valid, the valid key pair will not satisfy the session key protocol. The percentage of instances when a valid key pair does not satisfy the session key protocol is dependent upon the particulars of the key agreement used. An invalid key pair is one which was not generated using the key agreement protocol. We will use the notation (b', B') to denote an invalid key pair. In some instances, an invalid key pair (b', B') will satisfy the session key protocol. It is generally assumed that Bob will generate his private-public key pair (b, B) by following the key agreement protocol. The key agreement protocol is typically designed such that when properly followed, the number of valid private-public key pairs which will fail is very small relative to the number of valid private-public key pairs which will succeed in satisfying the session key protocol.

Alice's private key, a, is intended to remain private. If Bob wants to acquire Alice's private key, however, Bob can take advantage of the fact that some invalid keys will satisfy the session key protocol. In order to do so, Bob create an invalid key pair (b', B') and will send the invalid public key, B' to Alice. When Alice receives the invalid public key B', she will compute a session key, $k_A$ ($k_A$=aB'). Bob's corresponding session key computation is $k_B$=bA. Bob uses the session key to perform a cryptographic task, e.g. to encrypt a message. When Alice tries to decrypt the message received from Bob the cryptographic task of decryption will fail (e.g. Alice's attempt to decrypt will result in gibberish) because $k_A \neq k_B$. By using an invalid key pair, Bob, Bob can increase the probability that the session key created by Alice will not allow Alice to perform the cryptographic task. With this information, Bob will know whether or not the invalid public key B' he provided to Alice satisfied the equation aB'=b'A. Because Bob knows k (k=b'A) and Bob knows B', Bob has learned some information as to the characteristics of Alice's private key (i.e., Bob knows whether a satisfies aB'=b'A). If the invalid key pair selected by Bob is randomly selected, it is highly likely that the session key generated by Alice will fail. If Bob always receives, notice that the session key failed, this information is not useful to Bob in determining a. If Bob can select an invalid key pair (b', B') which will succeed more frequently (ideally at a rate of 50%), however, the information he obtains from Alice will be much more useful in determining Alice's private key, a. If Bob can define a set of possible private keys, a, with a success/failure rate near 50%, each time Bob uses an invalid key pair (b', B'), he eliminates 50% of the possible values of a. With repeated attempts to perform the cryptographic task, eventually, Bob would be able to determine Alice's private key. One way Alice may be able to avoid revealing such information about her private key to Bob is by first ensuring that Bob's public key is valid. For example, in elliptic curve cryptography, Bob's public key should represent a point on the elliptic curve, which Alice can easily test. This process is referred to as public key validation and is a standard security component of the key agreement processes. Although these types of checks may assist Alice for protocols intended to be secure against traditional computing platforms (e.g. elliptic curve), these types of checks will not suffice for protocols designed to be secure against a quantum computing system. Quantum-resistant key agreement protocols are based on technologies very different from those used in traditional public-key cryptography. For example, in lattice-based key agreements it is the case that public keys are indistinguishable from any other vector in space. Thus, these systems do not allow Alice to utilize any public key validation method to determine whether Bob followed the protocol when creating his public key, B.

Thus, there is a need for a new method of validating the public key to be used for transmitting and receiving encrypted messages which can be used with lattice-based and other quantum-resistant protocols.

SUMMARY OF THE INVENTION

Briefly, the present invention discloses a method for validating a private-public key pair.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
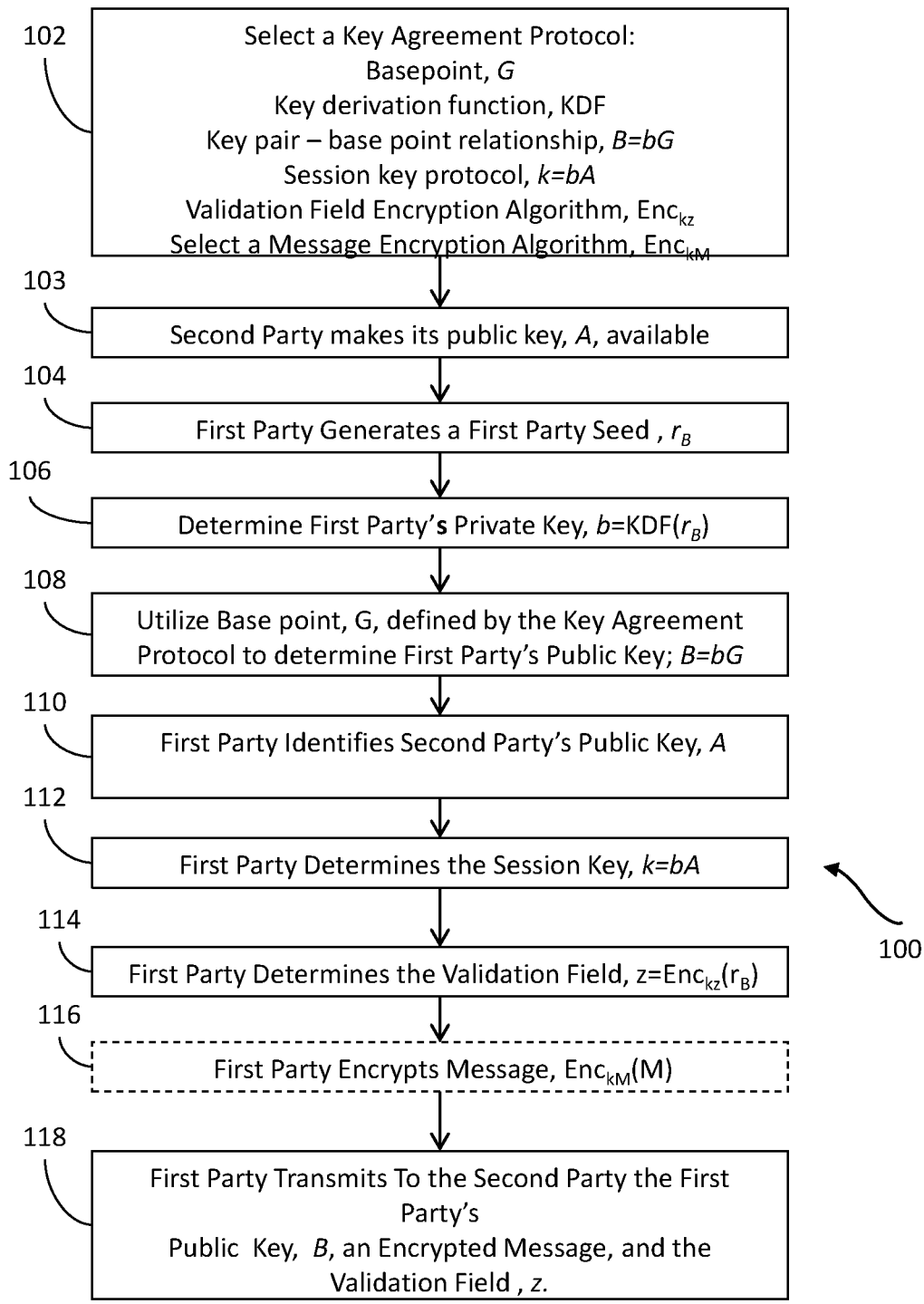
FIG. 1 illustrates the steps of the method of the present invention for validating a private-public key pair to be performed by a first party.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a private-public key pair validation method that works on protocols designed to be secure against traditional or quantum-resistant computing platforms. The private-public key pair validation method may be used to perform a variety of cryptographic tasks, for example authenticating a received message or communicating encrypted, or decrypting an encrypted message. For ease of discussion, the description below will describe the private-public key pair validation method of the present invention in the context of the cryptographic task of communicating encrypted messages. Also, as noted above, for ease of discussion, the names Alice and Bob will be used to identify the parties desiring to communicate encrypted messages or perform other tasks that rely on sharing a secret. Bob will represent the party desiring to send a message and therefore will be referred to the "first party" and Alice will represent the party desiring to receive the message and therefore will be referred to as the "second party". It is of course understood that either party may transmit or receive a message and that the terms "first" and "second" are simply used as a matter of convenience. The method of the present invention is intended for use in either traditional or quantum-resistant key agreement protocols. The method of the present invention is intended for use in an environment where the receiving party, Alice, reuses her private key for multiple sessions of encrypted communication, with a single or plurality of sending parties but Bob's key is intended for one-time use. An example of such an environment is static-ephemeral key agreement mode of the Transport Layer Security protocol. Another example is key reuse in the Internet Key Exchange protocol. Thus, Alice's public key, A, is understood to be readily available, however, Bob's public key, B, will be unique to each session of encrypted communication.

(U) FIG. 1 illustrates the steps of the method 100 of the present invention to be performed by a first party, i.e. the party which will initiate the cryptographic action, e.g. send the encrypted message. Before initiating communication, the parties begin at step 102 by selecting a key agreement protocol to be utilized for establishing communication. This key agreement protocol defines: a basepoint [G]; a key derivation function [KDF]; a key pair-basepoint relationship, [e.g., A=aG, B=bG]; a session key protocol; [e.g., k=aB, k=bA]; and a validation field encryption algorithm [$Enc_{kz}$]. In the event the parties wish to exchange encrypted messages, the key agreement protocol also defines a message encryption algorithm as well [$Enc_{kM}$]. The basepoint, G, may represent, for example, a point on an elliptic curve. Alternatively, the basepoint, G may represent a number modulo a large prime, or a lattice basis, for example. The key pair-basepoint relationship is an efficient algorithm to compute the public key from a private key and basepoint, such that it is impossible, or computationally difficult to recover the private key given the public key and basepoint. For example, on an elliptic curve the private key is a number a and the public key is a point, A, on the elliptic curve related to a by scalar multiplication of the basepoint, A=aG. The session key protocol is an efficient algorithm to compute a session key from one party's private key and another party's public key; the essential property of the session key protocol is that if the two parties use key pairs exhibiting the key pair-basepoint relationship, A=aG and B=bG, then the key session protocol computes the same session key for both private-public key combinations: aB=k=bA. The message encryption algorithm [$Enc_{kM}$] may be, for example, a block cipher such as AES. The validation field encryption algorithm [$Enc_{kZ}$] may be, for example, a block cipher such as AES.

At step 103, the second party, Alice, makes her public key, A, available to Bob.

Next at step 104, the first party, Bob, generates a first party seed, $r_B$ unique to the current session. For example, the first party seed, $r_B$, may be generated using a random bit generator (RBG) or a pseudorandom bit generator.

Next at step 106, the first party seed $r_B$, is utilized to determine Bob's private key, b. The private key is generated according to a fixed public deterministic algorithm or key derivation function (KDF) as specified in step 102. Bob's private key, b, may be determined, for example by converting a bit string representing seed, $r_B$, into an integer. Alternatively, the private key may be determined by deterministic pseudorandom number generator where $r_B$ is used as the seed to the generator. Thus, the private key, b, can be represented as KDF ($r_B$).

(U) Next at step 108, Bob utilizes the basepoint, G and the key pair-basepoint relationship to determine his public key, B=bG.

Next at step 110, Bob obtains Alice's static public key, A. For example, Alice's public key may be provided by Alice to Bob. Alternatively, Alice's public key may be available from an accessible database.

Next at step 112, Bob utilizes the session key protocol, k=bA, to determine the session key, k.

Next at step 114, Bob determines a validation field, z. The validation field will be utilized as described below to validate the ephemeral public key, B, which Bob will deliver to Alice. Utilizing the validation field encryption algorithm selected at step 102, the first party seed, $r_B$, generated at step 104, and the session key generated at step 112, the first party determines the validation field, z, $z=Enc_{kz}(r_B)$. Thus the validation field is a ciphertext representing encryption of Bob's seed, $r_B$, utilizing the validation field encryption algorithm.

Next, if Bob desires to send an encrypted message to Alice, at step 116, utilizing the session key from step 112 and the message encryption algorithm $Enc_{kM}$ selected at step 102, Bob, encrypts the message, M, to be delivered to Alice $[Enc_{kM}(M)]$.

Next at step 118, Bob transmits to Alice his public key, B; if desired, the encrypted message, $Enc_{kM}(M)$; and the validation field, z. Transmission of the validation field provides Alice with additional information which she may utilize to determine whether the public key, B is valid, i.e. whether the public key, B, was generated using a private key and the key pair-basepoint relationship.

Figure 2:
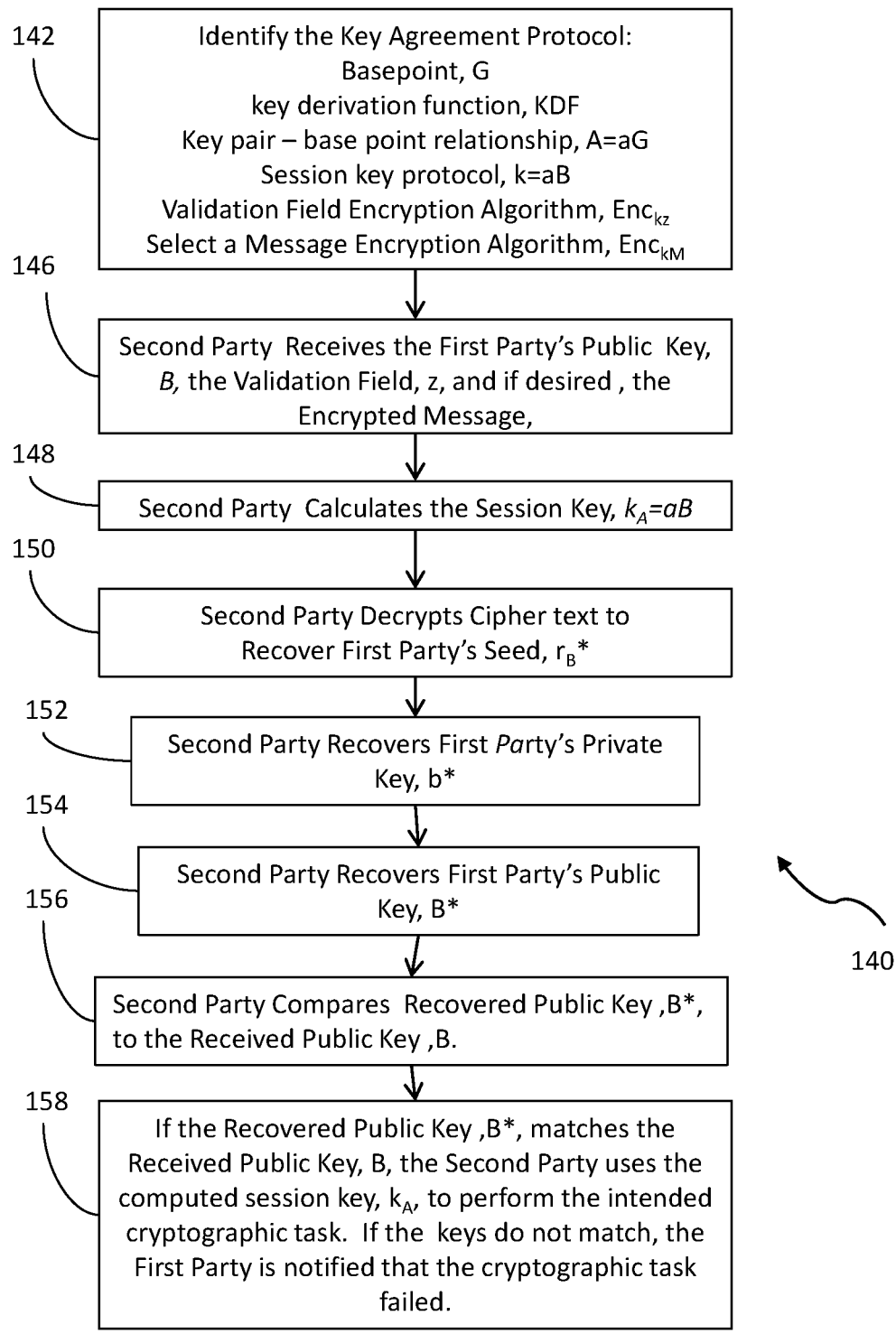
FIG. 2 illustrates the steps of the method of the present invention for validating a private-public key pair to be performed by a second party.

The second party steps 140 of the private-public key-pair validation method of the present invention are illustrated in FIG. 2. As illustrated in FIG. 2, the second party begins at step 142 by identifying the key agreement protocol used by the first party to perform the cryptographic task. As noted above, the key agreement protocol defines, for example: a basepoint [G]; a key derivation function [KDF]; a key pair-basepoint relationships, [A=aG, B=bG]; a session key protocol; [k=aB, k=bA]; and a validation field encryption algorithm $[Enc_{kz}]$. In the event the parties wish to perform the cryptographic task of exchanging encrypted messages, the key agreement protocol also defines a message encryption algorithm $[Enc_{kM}]$ as well. Next, at step 146 the second party, Alice, receives the first party's public key, B, the validation field, z, and, if desired, the encrypted message, $Enc_{kM}(M)$.

At step 148, the second party, Alice, calculates her session key, utilizing the public key received from Bob, $k_A$=aB. This session key is denoted $k_A$ to distinguish from session key computed by Bob at step 112.

Next, at step 150, Alice decrypts the ciphertext, z, to recover Bob's seed, $r_B$*, Bob's seed which is recovered by Alice is denoted $r_B$* to distinguish from the seed, $r_B$, which was calculated by Bob at step 104.

Next at step 152, Alice uses Bob's recovered seed, $r_B$*, to recover Bob's private key, b*. Bob's private key, recovered by Alice, is denoted b* to distinguish from the private key, b, which was calculated by Bob at step 106.

Next at step 154, Alice utilizing the recovered private key, b*, recovers Bob's public key, B*. Bob's public key recovered by Alice is denoted B* to distinguish from the public key, B, which Bob delivered to Alice at step 118.

Next at step 156, Alice compares the recovered public key, B* to the public key, B, determined by the first party at step 108 and transmitted to the second party at step 118.

At step 158, Alice determines whether the recovered public key, B* matches the delivered public key, B. If the recovered public key, B*, matches the received public key, B, the received public key, B, is considered valid and Alice will proceed to use her computed session key $k_A$ as Bob's session key k to perform the intended cryptographic task. For example, in the event an encrypted message was received from Bob, Alice will decrypt the encrypted message, $Enc_{kM}(M)$ to recover the message M. If however, the recovered public key, B*, does not match the received public key, B, the public key B received from Bob is considered invalid and Alice is informed that the communication is invalid. It is important to note that if Alice does not want to reveal information about her private key, she will not communicate to Bob that the session keys do not match. Alice may, however, communicate to Bob that the cryptographic task failed, e.g. the message failed to decrypt correctly. It is noted that regardless of whether the invalid public key provided by Bob would satisfy k=aB allowing Alice to perform the cryptographic task, if the public key is invalid (i.e. it was not created using the key agreement protocol), Alice will respond by notifying Bob that the cryptographic task failed. By providing the same response in each instance, Alice does not provide any information as to the characteristics of her private key, a. Alice therefore eliminates the vulnerability of the prior art method described above.

The present invention provides a key agreement process which can be used with protocols based on either traditional or quantum-resistant technology.

While embodiments of the present invention are shown and described, it is envisioned that those skilled in the art may devise various modifications of the present invention without departing from the spirit and scope of the appended claims.

The invention claimed is:

1. A method of validating a private-public key pair for use by a first party and a second party, the method comprising the steps of:
    identifying a key agreement protocol to be used to determine a private-public key pair, wherein said key agreement protocol defines a basepoint, a key derivation function, a key pair-basepoint relationship, a session key protocol, and a validation field encryption algorithm;
    generating a first party seed by the first party;
    defining a first party private key, by the first party, utilizing said first party seed in accordance with said key derivation function;
    utilizing said first party private key, by the first party, to define a first party public key in accordance with said key pair-basepoint relationship;
    identifying, by the first party, a second party public key;
    determining, by the first party, a first party session key in accordance with said session key protocol;
    determining, by the first party, a validation field by encrypting said first party seed in accordance with said validation field encryption algorithm;
    transmitting, by the first party, said first party public key and said validation field;
    receiving, by the second party, said first party public key, receiving said validation field by the second party;
    determining, by the second party, a second party session key in accordance with said session key protocol;
    utilizing, by the second party, said second party session key to decrypt said validation field to provide a recovered first party seed;
    utilizing, by the second party, said recovered first party seed and said key derivation function to generate a recovered first party private key;

utilizing, by the second party, said recovered first party private key and said basepoint to generate a recovered first party public key;

determining, by the second party, whether said recovered first party public key matches said received first party public key to validate the first party private-public key pair; and upon determining that the recovered public key and the received public key match, utilizing, by the second party, said second party session key to perform a cryptographic task.

2. The method of claim 1, wherein said step of identifying a key agreement protocol further includes defining a message encryption algorithm and said method further includes the steps of:

encrypting a message in accordance with said message encryption algorithm to provide an encrypted message;

transmitting said encrypted message; and upon validating the private-public key pair, utilizing the second party session key to decrypt the encrypted message.

3. The method of claim 2, wherein said message encryption algorithm is provided by a block cipher AES.

4. The method of claim 2, wherein said validation field encryption algorithm is the same as the message encryption algorithm.

5. The method of claim 1, wherein said key derivation function provides for the conversion of a bit string representing said first party seed to an integer.

6. The method of claim 1, wherein said basepoint is provided by a point on an elliptic curve.

7. The method of claim 1, wherein said key pair-basepoint relationship represents scalar multiplication of a point on an elliptic curve by an integer.

8. The method of claim 1, wherein said session key protocol represents scalar multiplication of a point on an elliptic curve by an integer.

9. The method of claim 1, wherein said validation field encryption algorithm is provided by the block cipher AES.

10. The method of claim 1, further including the step of:

upon determining that the recovered public key and the received public key do not match, reporting to the first party that a cryptographic task failed.

* * * * *